(12) United States Patent
Matsuura (10) Patent No.: US 11,917,313 B2
(45) Date of Patent: Feb. 27, 2024

(54) SOLID-STATE IMAGING DEVICE (71) Applicants: Kabushiki Kaisha Toshiba, Tokyo (JP); Toshiba Electronic Devices & Storage Corporation, Tokyo (JP)

(72) Inventor: Masakazu Matsuura, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/677,756

(22) Filed: Feb. 22, 2022

(65) Prior Publication Data

US 2023/0088834 A1    Mar. 23, 2023

(30) Foreign Application Priority Data

Sep. 21, 2021  (JP) .................................. 2021-153592

(51) Int. Cl.
*H04N 25/75*   (2023.01)
*H04N 25/60*   (2023.01)
*H04N 25/771*  (2023.01)

(52) U.S. Cl.
CPC ............. *H04N 25/75* (2023.01); *H04N 25/60* (2023.01); *H04N 25/771* (2023.01)

(58) Field of Classification Search
CPC ...... H04N 25/75; H04N 25/60; H04N 25/771; H04N 25/78

USPC ........................................................ 348/300
See application file for complete search history.

(56) References Cited

U.S. PATENT DOCUMENTS

| | | | |
|---|---|---|---|
| 5,434,619 A | 7/1995 | Yonemoto | |
| 2014/0139713 A1* | 5/2014 | Gomi .................... | H04N 25/709 348/308 |
| 2016/0337607 A1* | 11/2016 | Okamoto ............ | H01L 27/1464 |

FOREIGN PATENT DOCUMENTS

| | | |
|---|---|---|
| JP | H06-284347 A | 10/1994 |
| JP | 4599993 B2 | 12/2010 |
| JP | 2012-235298 A | 11/2012 |
| JP | 6324372 B2 | 5/2015 |
| WO | 2014/157086 A1 | 10/2014 |

* cited by examiner

*Primary Examiner* — Lin Ye
*Assistant Examiner* — Chan T Nguyen
(74) *Attorney, Agent, or Firm* — Allen & Overy LLP (57) ABSTRACT

According to one embodiment, a solid-state imaging device includes a plurality of pixels, a plurality of sampling switches, a plurality of sample-and-hold circuits, and a plurality of output switches. The plurality of pixels are arranged at least in a column direction. The plurality of sampling switches are configured to sample signals outputted from the pixels belonging to columns in parallel. The plurality of sample-and-hold circuits are configured to sample and hold signals outputted from the plurality of sampling switches. The plurality of output switches are configured to output signals stored in the plurality of sample-and-hold circuits at predetermined timing.

7 Claims, 11 Drawing Sheets

SOLID-STATE IMAGING DEVICE

CROSS REFERENCE TO THE RELATED APPLICATIONS

This application is based upon and claims the benefit of priority from the prior Japanese Patent Application No. 2021-153592, filed on Sep. 21, 2021, the entire contents of which are incorporated herein by reference.

FIELD

Embodiments of the invention relate to a solid-state imaging device.

BACKGROUND

In a solid-state imaging device, a method of executing sample and hold of temporarily sampling an output signal from a pixel may be employed when executing the AD (Analog to Digital) conversion. When realizing the sample and hold, sampling noise in outputting a final signal occurs depending on a sampling period. To cope with the occurrence, processing in an external digital circuit such as an IC (Integrated Circuit) is required. Further, to ensure the time for charge and discharge of the sample and hold, a sampling period with a fixed width is required, which prevents speed up. Problems in the case of speeding up the whole system are that the period of charge and discharge of the sampling is ensured and that a signal flat period necessary for digital processing is required.

DETAILED DESCRIPTION

According to one embodiment, a solid-state imaging device includes a plurality of pixels, a plurality of sampling switches, a plurality of sample-and-hold circuits, and a plurality of output switches. The plurality of pixels are arranged at least in a column direction. The plurality of sampling switches are configured to sample signals outputted from the pixels belonging to columns in parallel. The plurality of sample-and-hold circuits are configured to sample and hold signals outputted from the plurality of sampling switches. The plurality of output switches are configured to output signals stored in the plurality of sample-and-hold circuits at predetermined timing.

Hereinafter, embodiments will be explained referring to the drawings. Note that in the circuit diagrams, no power supply voltage is indicated in some cases, but necessary power supply voltages are appropriately applied to components. For example, in a source follower, an appropriate power supply voltage is applied to a constituent MOSFET (Metal-Oxide-Semiconductor Field-Effect Transistor) and a resistor connected to the MOSFET.

First Embodiment

Figure 1:
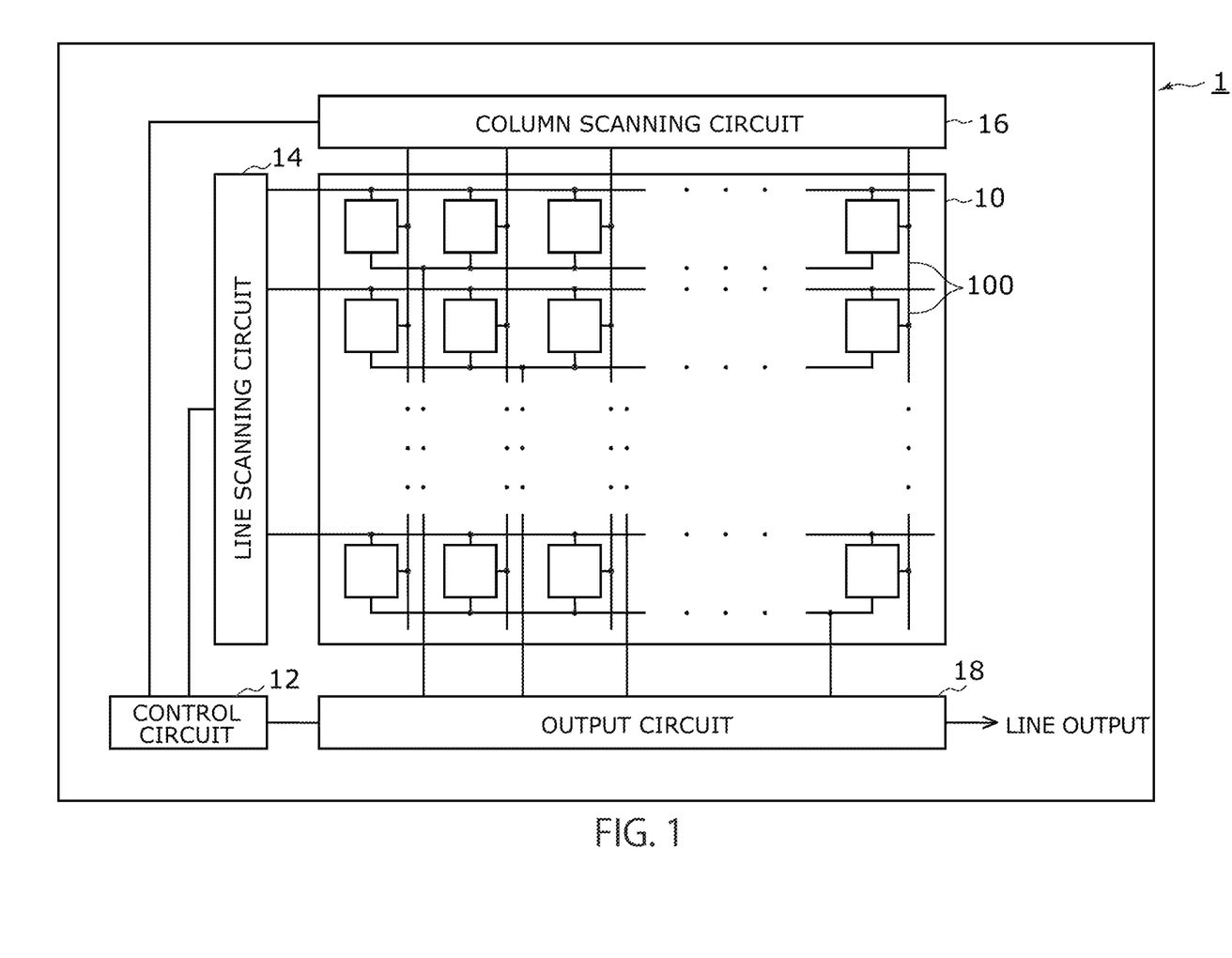
FIG. 1 is a block diagram schematically illustrating a solid-state imaging device according to an embodiment.

FIG. 1 is a block diagram schematically illustrating a solid-state imaging device according to an embodiment. A solid-state imaging device 1 includes a pixel array 10, a control circuit 12, a line scanning circuit 14, a column scanning circuit 16, and an output circuit 18. The solid-state imaging device 1 further includes, for example, not-illustrated storage circuit, image-processing circuit, display, various input/output interfaces, and other circuits, modules, and devices as needed.

The pixel array 10 constitutes a light receiver in the solid-state imaging device 1. A plurality of pixels 100 are arranged, for example, in a two-dimensional array form, and the plurality of pixels 100 arranged in the array form constitute the pixel array 10.

The control circuit 12 executes control of the circuits, modules and so on in the solid-state imaging device 1. The control circuit 12 is composed of, for example, an appropriate processor.

The line scanning circuit 14 outputs signals for designating lines of the pixels 100 in the pixel array 10, and signals are properly outputted from the pixels 100 belonging to predetermined lines based on the signals.

The column scanning circuit 16 outputs signals for designating columns of the pixels 100 in the pixel array 10. Output signals from the pixels 100 belonging to the lines designated by the line scanning circuit 14 are outputted to the output circuit 18 for each column belonging to the columns designated by the column scanning circuit 16.

The output circuit 18 includes signal processing circuits for respective lines, and appropriately processes analog signals outputted from the pixels 100 and then appropriately outputs the processed signals by each of the lines designated by the line scanning circuit 14. More specifically, the output circuit 18 performs signal processing for each column for the pixels 100 belonging to one or a plurality of lines selected by the line scanning circuit 14 and then outputs a signal for the pixels 100 along the line as a line signal. In the case where the line scanning circuit 14 selects a plurality of lines at the same timing, the output circuit 18 processes the signals belonging to the plurality of lines in parallel. Each of the signal processing circuits provided in the output circuit 18 includes, for example, an amplifier which appropriately amplifies the outputs from the pixels 100. In this disclosure, by controlling a sample-and-hold function in the amplifier, the reduction of noise and the speed-up of processing in the solid-state imaging device 1 are achieved.

The signal outputted from the output circuit 18 is appropriately processed, for example, by the not-illustrated image-processing circuit, and output or stored in the storage circuit. The output circuit 18 outputs, for example, an analog line signal, and the analog line signal may be converted to a digital signal by an ADC (Analog to Digital Converter) connected at a subsequent stage and subjected to digital signal processing such as image processing. Note that the output circuit 18 may include the ADC, in which case a line signal obtained by converting the analog signal outputted from the pixel 100 into the digital signal via the ADC may be output.

Figure 2:
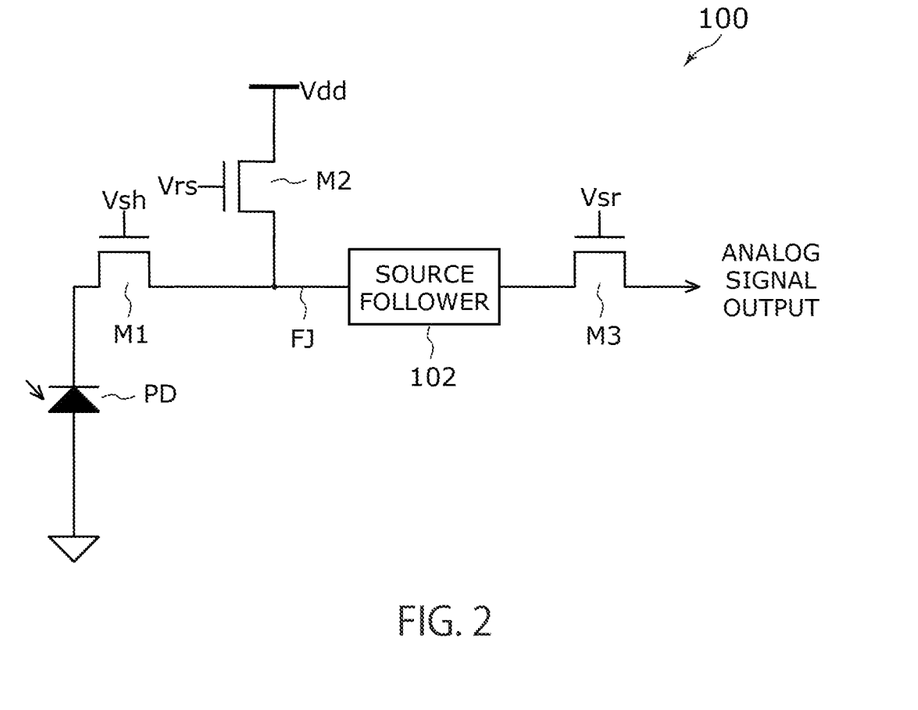
FIG. 2 is a diagram schematically illustrating an example of the configuration of a pixel according to an embodiment.

FIG. 2 is a diagram illustrating an example of the configuration of the pixel 100. The pixel 100 includes a light receiving element PD and a pixel circuit.

The light receiving element PD is, for example, a photodiode. The light receiving element PD has an anode which is grounded and a cathode from which current is outputted according to the intensity of received light. The light receiving element PD may be an APD (Avalanche Photo Diode) or a SPAD (Single Photon Avalanche Diode). In the case of these diodes, the anode is not grounded but may have an appropriate negative voltage applied. The received light may be, for example, visible light or infrared light, or may be light having other wavelengths.

The pixel circuit is a circuit which outputs an analog signal outputted from the light receiving element PD, at appropriate timing, and is provided in each pixel 100, namely, for each light receiving element PD. As another example, a charge detector common to the plurality of pixels 100, namely, the plurality of light receiving elements PD may be provided. The pixel circuit includes transistors M1, M2, M3 and a source follower 102 as an example but, not limited to this configuration, may be connected to the output circuit in this disclosure even in other configurations.

The transistor M1 is a transistor which transfers the signal outputted from the light receiving element PD to a charge detector FJ. The signal outputted from the light receiving element PD is outputted to the charge detector FJ via the transistor M1 at timing based on a voltage Vsh applied to the gate.

The transistor M2 is a transistor which resets the charge detector FJ. The transistor M2 resets the potential of the charge detector FJ to a potential based on a power supply voltage Vdd at timing based on a voltage Vrs applied to the gate after the signal is read from the charge detector FJ. By resetting the charge detector FJ, the pixel 100 can appropriately detect the signal received by the light receiving element PD at next light-receiving timing.

The source follower 102 is used as a buffer for the signal in the charge detector FJ. The source follower 102 is not an essential component, and therefore does not need to be provided depending on the configuration of the pixel 100 or may be another component.

The transistor M3 operates as a shift register. The transistor M3 outputs an analog signal based on the intensity of the light received by the light receiving element PD at appropriate timing based on a voltage Vsr.

The pixel 100 outputs the analog signal outputted from the transistor M3, the analog signal is inputted into the output circuit 18 at timing controlled by the column scanning circuit 16. More specifically, the column scanning circuit 16 applies the signal Vsr for controlling the timing when the transistor M3 is turned on to each pixel 100.

Figure 3:
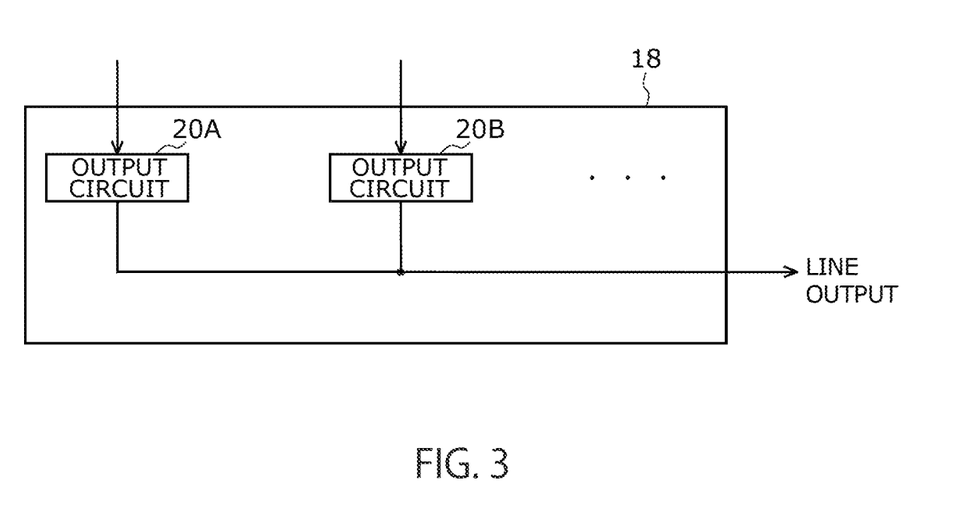
FIG. 3 is a diagram schematically illustrating an example of the configuration of an output circuit according to an embodiment.

FIG. 3 is a diagram illustrating an example of the configuration of the output circuit 18. The analog signal outputted from the pixel 100 at timing controlled by the line scanning circuit 14 and the column scanning circuit 16 is inputted into the output circuit 18. The output circuit 18 includes a plurality of output circuits 20A, 20B, . . . each of which is provided for each line.

The output circuit 20 is a circuit which samples and holds the analog signal outputted from the pixel 100. The output circuit 20 samples and holds the analog signal to appropriately amplify the signal outputted from the pixel 100, and outputs the amplified signal at appropriate timing.

The signal outputted from each of the output circuits 20A, 20B, . . . is outputted as a digital line signal at timing when outputting a line controlled by the line scanning circuit 14. Note that though not illustrated, a buffer or the like may be appropriately provided at the stage subsequent to the output circuit 18 so as to appropriately make the outputs from the output circuit 18 for columns into serial signals, or a line buffer or the like may be appropriately provided because the signals to be outputted are serial signals on a line basis. As another example, the buffer may be installed in the later-explained output circuit. For example, a later-explained source follower 214 in FIG. 4 may operate as the line buffer.

Note that the output circuits 20A, 20B, . . . are provided in the output circuit 18 in the configuration in FIG. 3, but the configuration is not limited to this. For example, circuits such as a regulator and an amplifier which appropriately control the current, voltage and so on may be provided between the pixel array 10 and the output circuit 18. On the other hand, the output circuits 20A, 20B, . . . may be arranged in place of the circuits such as the regulator and the amplifier or may be provided as circuits each of which amplifies and stabilizes the signal for line output. More specifically, the configuration in this disclosure is indicated as an example, and the configuration of the circuit can be appropriately modified within a range where the similar operation is realized.

Figure 4:
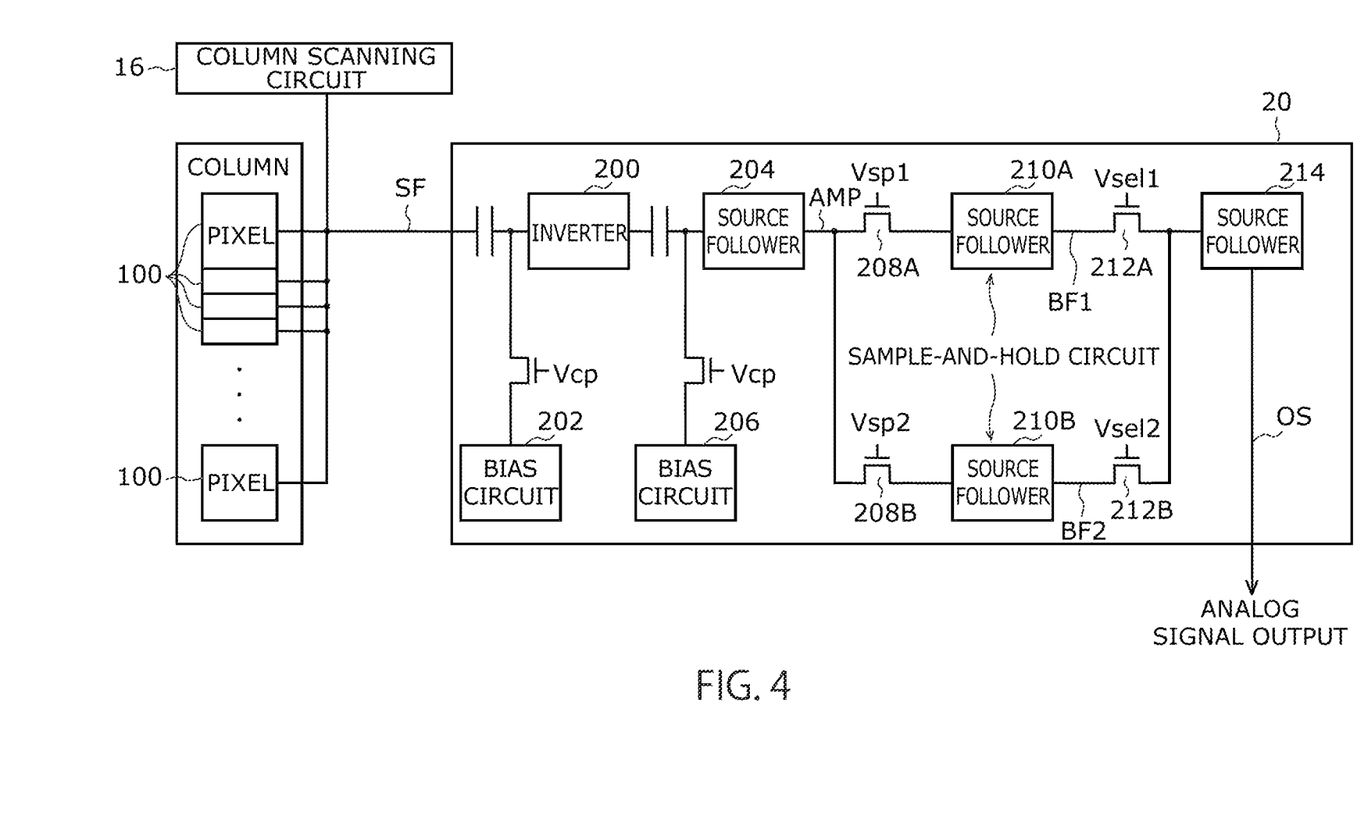
FIG. 4 is a diagram schematically illustrating an example of the configuration of the output circuit according to an embodiment.

FIG. 4 is a circuit diagram schematically illustrating an example of the output circuit according to an embodiment. The output circuit 20 includes an inverter 200, bias circuits 202, 206, source followers 204, 210, 214, sampling switches 208, and output switches 212. Further, other elements such as capacitors and switches are appropriately provided as illustrated in the drawing.

The outputs from the pixels 100 belonging to the same line are inputted into one output circuit 20. This signal is transferred via a conducting wire arranged for each line. Note that the output circuit 20 does not need to be provided in a one-to-one relation in all lines, and one output circuit 20 may be provided for each plurality of lines which are not designated at the same timing. As another example, the pixels 100 in each line may be connected to a plurality of output circuits 20, or the control circuit 12 or the line scanning circuit 14 may appropriately switch which of the output circuits 20 a certain line is connected.

The inverter 200 inverts the analog signal outputted from the pixel 100 and outputs the inverted analog signal. The inverter 200 switches the switch at appropriate timing to thereby execute the inversion of the signal to which a bias voltage is applied from the bias circuit 202.

The source follower 204 is connected to the inverter 200 and operates as a buffer which controls the impedance of the signal inverted by the inverter 200 and outputs the resulting signal. Further, the source follower 204 may be adjusted in gain so as to operate as an amplifier.

The sampling switches 208 are switches which are connected to the source follower 204 and operate to distribute a signal AMP outputted from the source follower 204 to one of the source followers 210 provided in parallel for sampling. The output circuit 20 includes, for example, a first sampling switch 208A and a second sampling switch 208B. These two sampling switches 208 are controlled in a manner not to be turned on at the same timing.

The source followers 210 operate as sample-and-hold circuits. In the case of distributing the signals output from the source followers 204 to two paths by the first sampling switch 208A and the second sampling switch 208B, a first sample-and-hold circuit 210A and a second sample-and-hold circuit 210B are provided which are composed of two source followers 210 provided in parallel. The first sample-and-hold circuit 210A is connected to the first sampling switch 208A, and the second sample-and-hold circuit 210B is connected to the second sampling switch 208B. Each of the source followers 210 has circuit elements arranged to operate as a sample-and-hold circuit.

The output switches 212 are switches which connect the plurality of source followers 210 and the output terminal of the output circuit 20 at appropriate timing, and select the output from the source follower 210 being an appropriate sample-and-hold circuit. Hereinafter, in the case where the signals AMP are distributed to the two paths as with the source followers 210, a first output switch 212A which controls the output from the first sample-and-hold circuit 210A and a second output switch 212B which controls the output from the second sample-and-hold circuit 210B are provided as the output switches 212. In other words, the first output switch 212A is connected to the first sample-and-hold circuit 210A, and the second switch 212B is connected to the second sample-and-hold circuit 210B.

Each of the sampling switches 208 and each of the output switches 212 is, for example, an nMOS and its ON/OFF state is switched based on the voltage applied to the gate.

The source follower 214 is a circuit which operates as a buffer, and is a circuit which outputs the outputs from the sample-and-hold circuits outputted via the plurality of output switches 212, to the outside. Via the source follower 214, the output circuit 20 outputs a signal OS being a final output.

Figure 5:
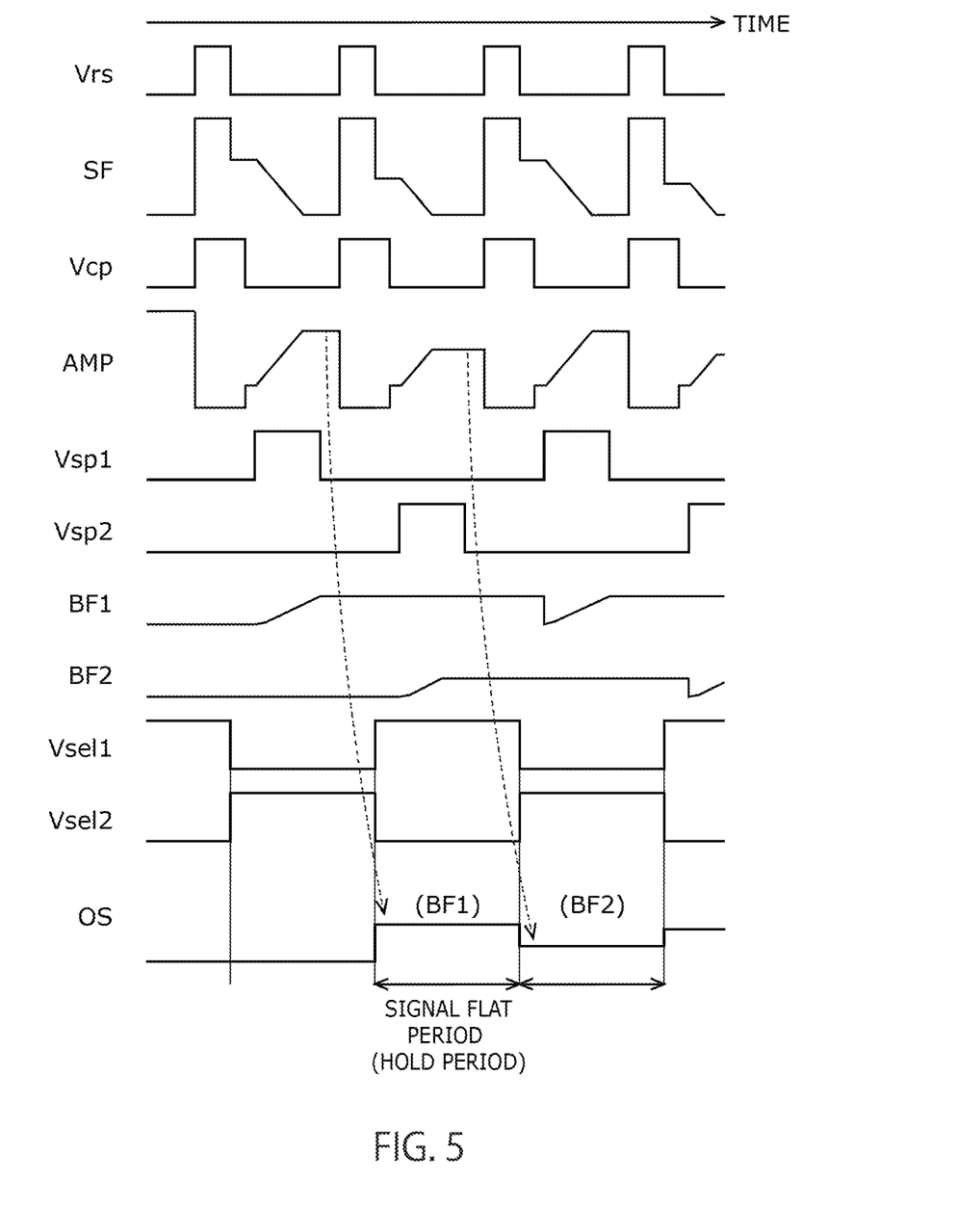
FIG. 5 is a timing chart of the circuit in FIG. 4.

FIG. 5 is a timing chart of the plurality of pixels 100 and the output circuit 20. Vrs shows timing of resetting in the pixel 100. When Vrs becomes High, the potential of the charge detector FJ is reset. After Vrs is controlled to Low, an input signal SF to the output circuit 20 changes according to the intensity of light entering the light receiving element PD via the shift register.

At appropriate timing, the bias circuits and the signal transmission paths are connected to apply the bias voltage. After the voltages of nodes are reset by the bias circuits, the signal AMP being the output from the source follower 204 is shifted based on the input signal SF.

The signal AMP is transferred to one of the source followers 210 based on the operation of the sampling switches 208. For example, when Vsp1 becomes High, the first sampling switch 208A is turned on, the signal AMP starts the sample and hold in the first sample-and-hold circuit 210A, and the potential at the timing when Vsp1 becomes Low is held in the first sample-and-hold circuit 210A. This shift is expressed by the shift of BF1 in FIG. 5.

The signal BF1 held in the first sample-and-hold circuit 210A is outputted at timing when Vsel1 becomes High and the first output switch 212A is turned on, and outputted to the ADC 22 via the source follower 214. In a period during which Vsel1 is High, the signal BF1 is included in a hold period (signal flat period) in the sample and hold, and therefore the signal can be outputted in a state of avoiding noise until shift to a hold signal. More specifically, the signal BF1 is outputted at timing when it is flat after the shift without including a signal on the way of BF1 shifting based on AMP in the first sample-and-hold circuit 210A. As a result of this, the signal OS is in a state of being stable as a predetermined value at timing when executing the AD conversion in the ADC 22, thus enabling removal of the occurrence of noise due to the sample and hold in the AD conversion.

During the period when BF1 is sampled and held, processing of the input signal from the next pixel 100 is executed. The signal from the next pixel 100 is similarly repeated from the timing reset in Vrs applied in common to the pixels 100 in a column. More specifically, the signal SF outputted from the pixel 100 is converted to the signal AMP via the inverter 200 and the source follower 204. At this timing, Vsp2 is made High to turn on the second sampling switch 208B, thereby executing the sample and hold of the signal AMP in the second sample-and-hold circuit 210B. Then, the signal BF2 is similarly outputted as the signal OS via the source follower 214 during the period when the processing of the input signal from the next pixel 100 is being executed in the first sample-and-hold circuit 210A.

As found from the timing chart, the timing when the first sampling switch 208A is turned on is during the period when the second output switch 212B is ON, and the timing when the second sampling switch 208B is turned on is during the period when the first output switch 212A is ON. Further, the two sampling switches are never turned on at the same timing and, similarly, the two output switches are never turned on at the same timing.

As explained above, according to this embodiment, the signal value can be fixed to a predetermined value while the signal OS is outputted as 1 bit. As a result, the noise due to the sampling period in the sample and hold in the AD conversion in the ADC 22 can be suppressed.

More specifically, there are generally a period for sampling and a period for holding the sampled signal in the sample-and-hold circuit. By controlling the timing as in this embodiment, it is possible to appropriately output the signal value in the hold period after sampling without outputting the signal value in the sampling period from the signal OS to be outputted. As a result, in the AD conversion in the ADC 22, the noise due to fluctuation in signal value during the sampling period can be suppressed.

Note that the configuration in which two sampling switches 208 are provided as elements arranged in parallel, and two source followers 210 performing sample-and-hold operation for the respective sampling switches 208 and two output switches 212 selecting the output from which of the sample-and-hold circuits as a final output are provided is explained in FIG. 4, but not limited to this. For example, the configuration may be made such that signals are distributed to three or more paths in each of which the sample-and-hold and the selection of output can be appropriately realized.

Second Embodiment

In the above first embodiment, the outputs from the pixels 100 belonging to the columns are inputted into the elements of the output circuit 20 through the same path. When the number of pixels is increased to increase the number of lines, the load capacitance in the outputs from the pixels 100 belonging to the columns increases. In this embodiment, a solid-state imaging device 1 which suppresses the fluctuation in signal depending on the load capacitance will be explained.

Figure 6:
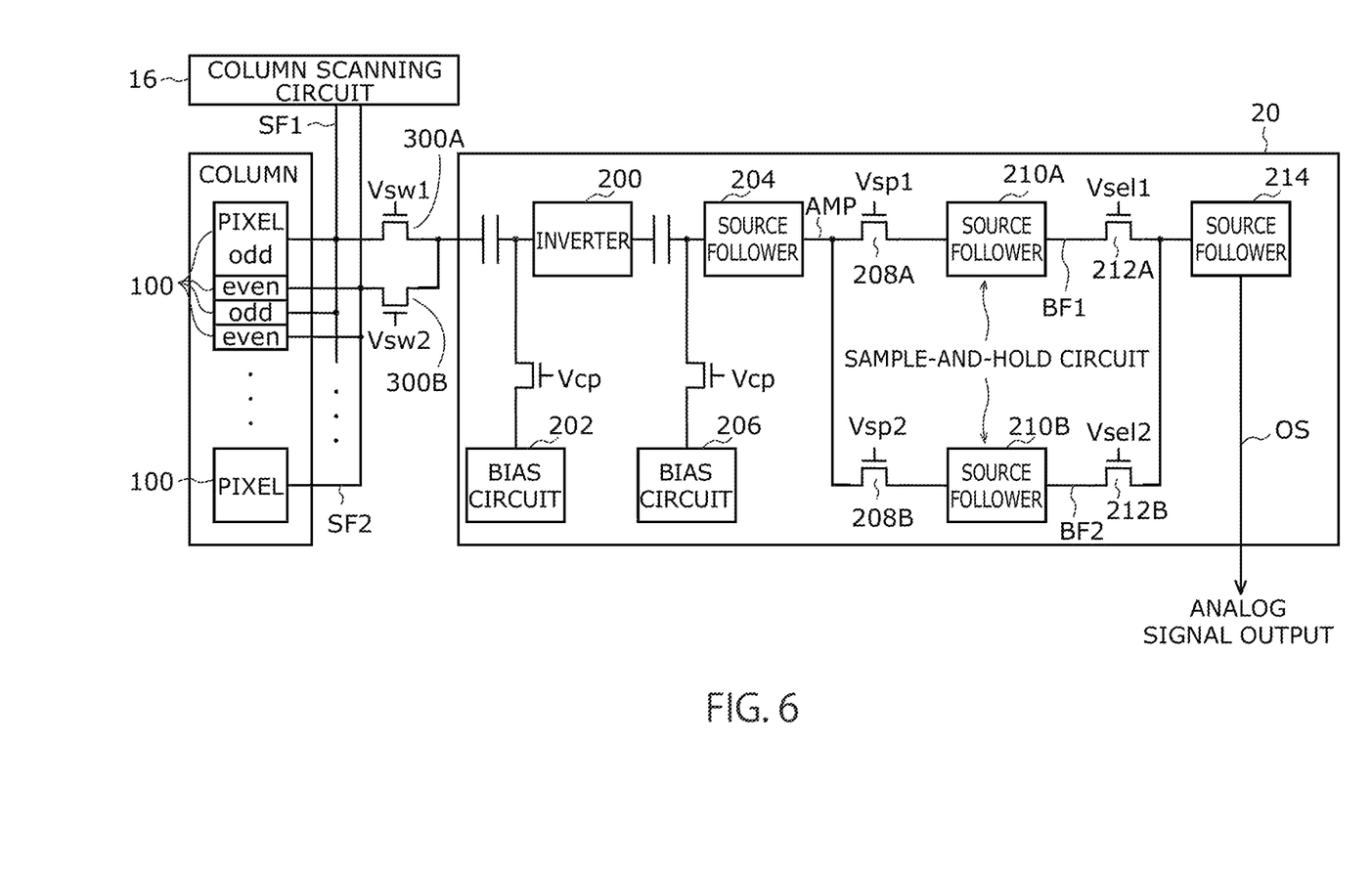
FIG. 6 is a diagram schematically illustrating an example of the configuration of an output circuit according to an embodiment.

FIG. 6 is a diagram schematically illustrating an example of an output circuit according to a second embodiment. The solid-state imaging device 1 includes two or more paths each of which outputs the signals from the pixels 100 on a column basis, and an input switch 300 is provided in each of the paths.

In the solid-state imaging device 1, for example, the pixels 100 belonging to odd columns and the pixels 100 belonging to even columns are distributed as pixel groups for each line. In the example in FIG. 6, in the solid-state imaging device 1, the pixels 100 and the output circuit 20 are connected via two paths in each line. More specifically, the pixels 100 in each line are distributed to a pixel group belonging to the odd columns and a pixel group belonging to the even columns, and each of the pixel groups has a path for transferring the signal to the output circuit 20.

In each of the paths, an input switch 300 is provided. For example, as illustrated in FIG. 6, a first input switch 300A is provided in the path connecting the pixels 100 belonging to the odd columns and the output circuit 20, and a second input switch 300B is provided in the path connecting the pixels 100 belonging to the even columns and the output circuit 20.

Each of the input switches 300 is an nMOS and its connection state is turned ON/OFF by the voltage applied to the gate. By providing the input switch 300, each of the pixel groups is connected to the output circuit 20 at appropriate timing.

Figure 7:
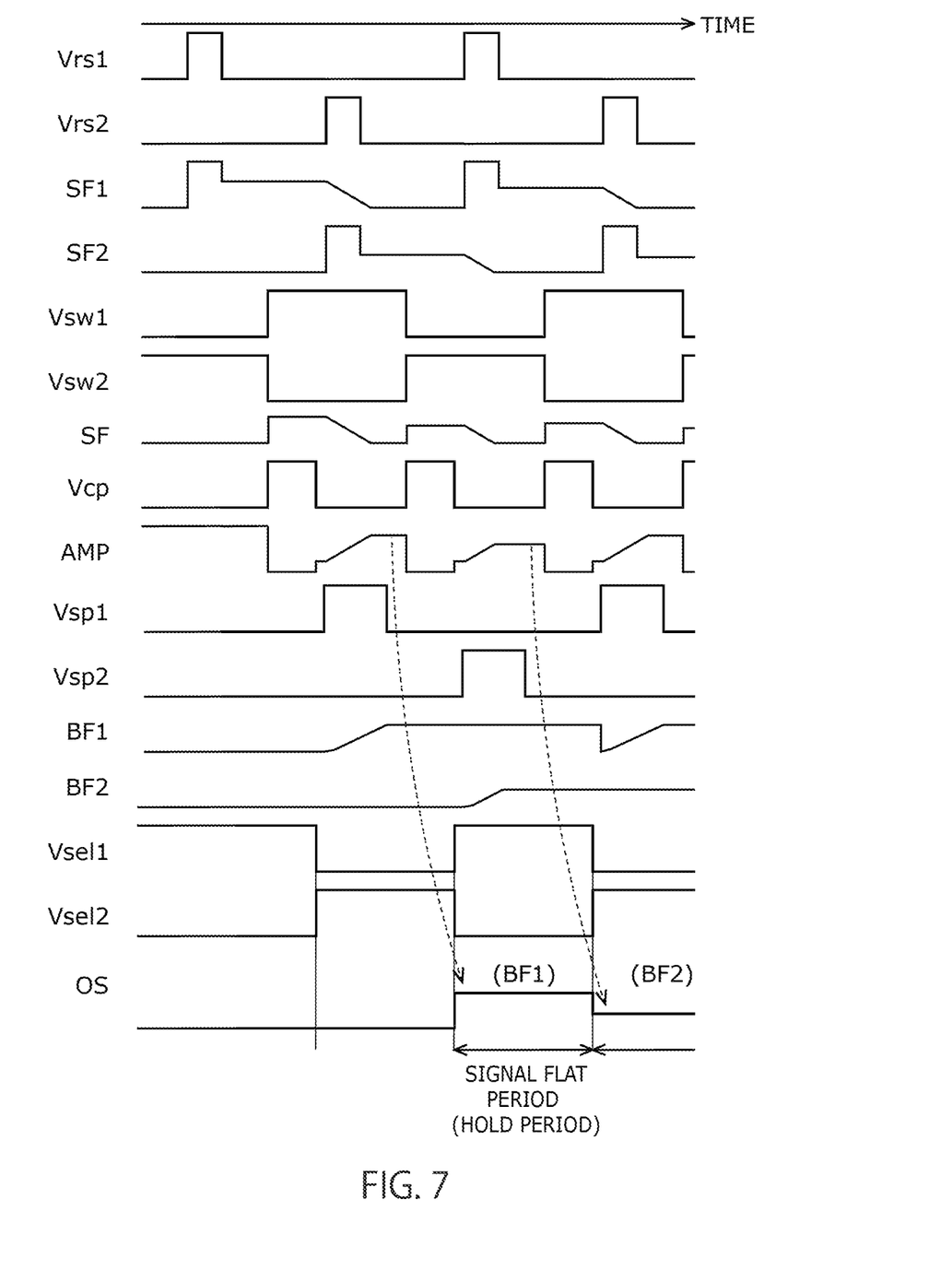
FIG. 7 is a timing chart of the circuit in FIG. 6.

FIG. 7 is a timing chart of the plurality of pixels 100 and the output circuit 20. Vrs1, Vrs2 are signals for performing reset-control in the pixels 100 belonging to the odd columns and the even columns, respectively. In this embodiment, control is conducted such that the reset timing differs for each pixel group also in the pixel circuits of the pixels 100.

When Vrs1 becomes High and then becomes Low, a signal SF1 is outputted from the pixels 100 belonging to the odd columns via the shift register. The SF1 is inputted into the output circuit 20 as the signal SF1 at timing when Vsw1 becomes High to turn on the first input switch 300A.

Vcp becomes High at this timing to shift nodes connected to the bias circuits in the output circuit 20 to a reset potential. In other words, the signal AMP is reset. When Vcp becomes Low, the signal AMP becomes a signal made by inverting and amplifying the signal SF via the inverter 200 and the source follower 204.

The timing thereafter is the same as that in the above first embodiment, and a signal sampled and held at appropriate timing is outputted.

As illustrated in FIG. 7, the first input switch 300A and the second input switch 300B are controlled to be exclusively turned on. Thus, as the signal SF to be inputted into the output circuit 20, the signal SF1 from the pixels 100 belonging to the odd columns or the signal SF2 from the pixels 100 belonging to the even columns is exclusively selected and inputted into the output circuit 20.

As explained above, according to this embodiment, the signals to be inputted into the output circuit 20 can be divided on a pixel group basis. As compared with the case where one path is provided for the pixels 100 belonging to the line, the load capacitance in the output circuit 20 can be decreased in the case where the pixels are distributed to the pixel groups. Therefore, in the case of increasing the number of pixels in the light receiving region in the solid-state imaging device 1, for example, improving the resolution, the noise due to the load capacitance and the power consumption can be reduced.

Further, the response at the rise of the signal SF can be separated from the reset control in the pixels 100. Therefore, the output from the pixels 100 can be transferred to the output circuit 20 in a more stable state.

Note that the outputs from the pixels 100 are divided into the two paths in FIG. 6, but not limited to this. For example, such a configuration may be made that the plurality of pixels 100 belonging to the same line are divided into three or more pixel groups and the outputs from the pixel groups are sampled and held at the appropriate timing. This configuration can be implemented by providing paths each transmitting a line for each pixel group as in the above second embodiment, and an arbitrary number of input switches such as a third input switch, a fourth input switch, . . . which connect these paths and the sample-and-hold circuits at arbitrary timing.

First Implementation Example

Next, an implementation example of the circuits in the above first embodiment and second embodiment will be explained. In the output circuit 20, the inverter 200, the source follower 204, the source followers 210, and the source follower 214 can be implemented using nMOSs.

Figure 8:
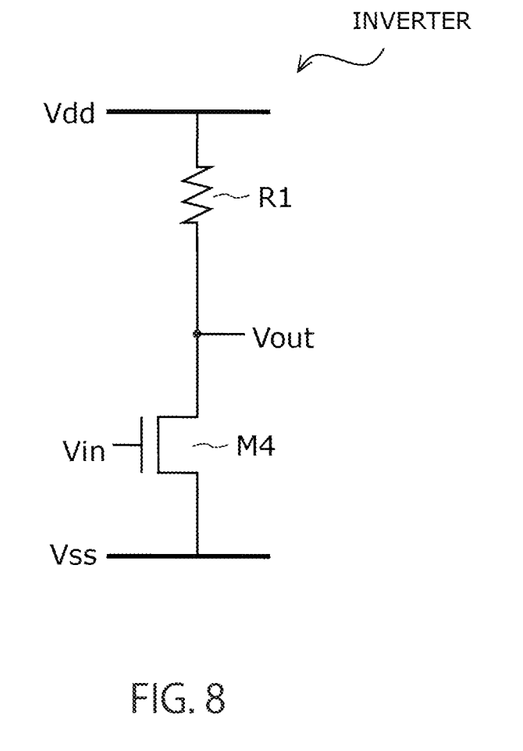
FIG. 8 is a diagram illustrating an example of the configuration of an inverter according to an embodiment.

FIG. 8 is a diagram illustrating an example of an inverter in this implementation example. The inverter is composed of, for example, a resistor R1 and an nMOS M4. The resistor R1 has one end connected to the power supply voltage Vdd and another end connected to the drain of the nMOS M4. The nMOS M4 has a source connected to the power supply voltage Vss.

An input voltage Vin is inputted into the gate of the nMOS M4. From a node connected to the drain of the nMOS M4, an output voltage Vout is outputted.

The inverter may be composed using the nMOS as explained above.

Figure 9:
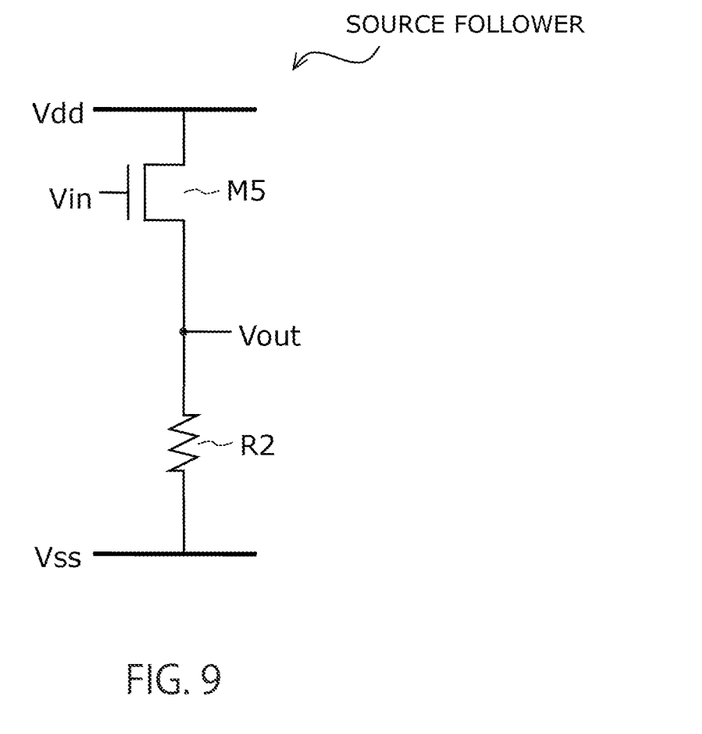
FIG. 9 is a diagram illustrating an example of the configuration of a source follower according to an embodiment.

FIG. 9 is a diagram illustrating an example of a source follower in this implementation example. The source follower is composed of, for example, an nMOS M5 and a resistor R2. The nMOS M5 has a drain connected to the power supply voltage Vdd and a source connected to one end of the resistor R2. The resistor R2 has another end connected to the power supply voltage Vss.

The input voltage Vin is inputted into the gate of the nMOS M5. From a node connected to the source of the nMOS M5, the output voltage Vout is outputted.

The source follower may be composed using the nMOS as explained above.

By constituting the inverter and the source follower using the nMOSs, the circuit area can be reduced.

Second Implementation Example

Figure 10:
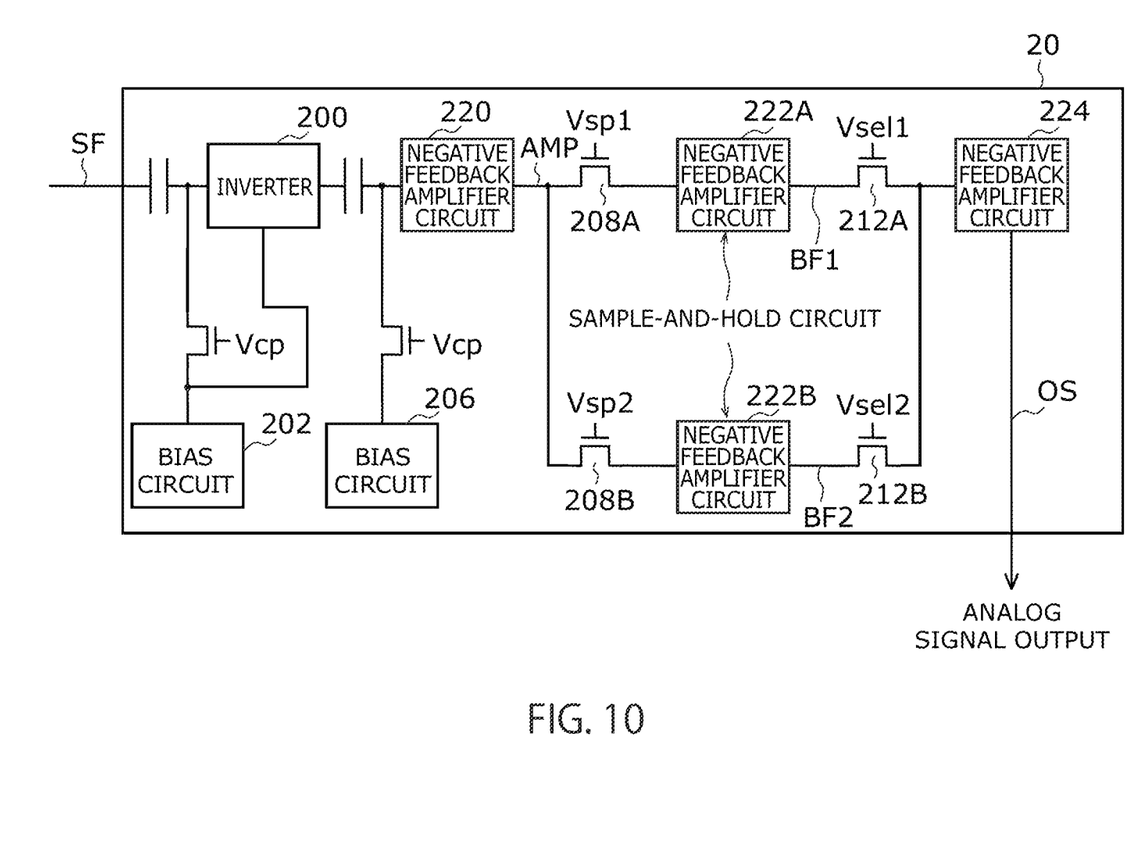
FIG. 10 is a diagram schematically illustrating an example of the configuration of the output circuit according to an embodiment.

FIG. 10 is a diagram illustrating another concrete example of the circuit elements in the output circuit 20 in each of the above embodiments. The output circuit 20 may be implemented using a negative feedback amplifier circuit in place of the source follower. In this case, the output circuit 20 includes an inverter 200, bias circuits 202, 206, negative feedback amplifier circuits 220, 222, 224, sampling switches 208, and output switches 212.

As illustrated in FIG. 10, for example, the source followers in FIG. 4 and FIG. 6 can be replaced with the negative feedback amplifier circuits.

Figure 11:
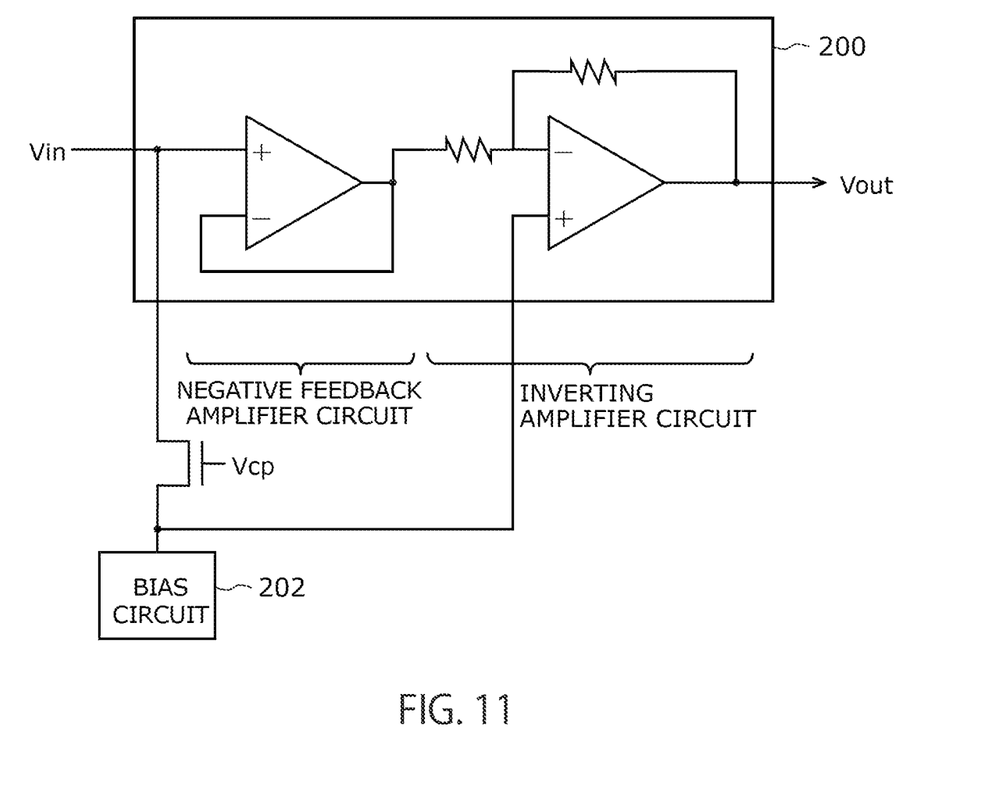
FIG. 11 is a diagram illustrating an example of the configuration of the inverter according to an embodiment.

FIG. 11 is a diagram illustrating an example of the inverter in this implementation example. As illustrated in FIG. 11, the inverter 200 may be composed of a negative feedback circuit and an inverting amplifier circuit.

Further, each of the negative feedback amplifier circuits 220, 222, 224 may have a configuration similar to that of the negative feedback amplifier circuit illustrated in FIG. 11.

The amplifier circuits illustrated in FIG. 10 and FIG. 11 may be composed of CMOSs (Complementary MOSs). Use of the CMOSs can improve the stability of the output signal though the circuit area increases as compared with the first implementation example.

Note that the outputs on a line basis are appropriately processed in each of the above embodiments but, not limited to the line direction, the outputs on a column basis may be appropriately processed. As above, the output circuit only needs to be arranged at an appropriate position in the circuit into which signals are successively inputted as in each of the above embodiments, in which case the sample and hold can be appropriately realized.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A solid-state imaging device comprising:
    a plurality of pixels arranged at least in a column direction;
    a plurality of sampling switches configured to sample signals outputted from the pixels belonging to columns in parallel;
    a plurality of sample-and-hold circuits configured to sample and hold signals outputted from the plurality of sampling switches; and
    a plurality of output switches configured to output signals stored in the plurality of sample-and-hold circuits at predetermined timing,
    wherein the plurality of sampling switches comprise a first sampling switch and a second sampling switch which is not turned on at the same timing with the first sampling switch, the plurality of sample-and-hold circuits comprise a first sample-and-hold circuit which is connected to the first sampling switch and a second sample-and-hold circuit which is connected to the second sampling switch, and the plurality of output switches comprise a first output switch which is connected to the first sample-and-hold circuit and a second output switch which is connected to the second sample-and-hold circuit and not turned on at the same timing with the first output switch,
    wherein the timing when the first sampling switch is turned on is during a period when the second output switch is ON, and the timing when the second sampling switch is turned on is during a period when the first output switch is ON.

2. The solid-state imaging device according to claim 1, wherein the pixels are two-dimensionally arranged in a line direction and the column direction.

3. The solid-state imaging device according to claim 1, wherein:
    the columns are divided into a plurality of groups to form a plurality of pixel groups corresponding to the columns belonging to the plurality of groups; and
    the solid-state imaging device further comprises a plurality of input switches each of which is connected to each of the divided pixel groups and exclusively tuned on.

4. The solid-state imaging device according to claim 1, wherein:
    the pixels are two-dimensionally arranged in a line direction and the column direction;
    the solid-state imaging device further comprises:
        a first input switch which is connected to a plurality of pixels belonging to even-numbered columns in lines; and
        a second input switch which is connected to a plurality of pixels belonging to odd-numbered columns in the lines; and
    the first input switch and the second input switch are exclusively tuned on.

5. The solid-state imaging device according to claim 1, further comprising:
    an inverter and a first source follower which are provided between the pixels and the sampling switches; and
    second source followers which are connected to the output switches, wherein:
    a signal is outputted via the second source follower; and
    the inverter, the first source follower, the second source followers, and the plurality of sample-and-hold circuits are composed of nMOSs (n-type Metal-Oxide-semiconductor Field Effect transistors).

6. The solid-state imaging device according to claim 1, further comprising, between the pixels and the sampling switches:
    an inverter which is connected to the pixels;
    a first negative feedback amplifier circuit which is connected to the inverter and the sampling switches; and
    second negative feedback amplifier circuits which are connected to the output switches, wherein:
    a signal is outputted via the second negative feedback amplifier circuit;
    the inverter comprises a negative feedback amplifier circuit and an inverting amplifier circuit; and
    the plurality of sample-and-hold circuits comprise the negative feedback amplifier circuits.

7. The solid-state imaging device according to claim 1, further comprising
    a buffer configured to store parallel signals which are outputted via the plurality of output switches, wherein
    the signals stored in the buffer are outputted as serial signals along a line direction.

* * * * *